US009971776B1

(12) United States Patent
Satish et al.

(10) Patent No.: US 9,971,776 B1
(45) Date of Patent: May 15, 2018

(54) METHOD AND APPARATUS FOR EXTENDING FUNCTIONALITY OF AN OPERATING SYSTEM

(75) Inventors: Sourabh Satish, Fremont, CA (US); Brian Hernacki, San Carlos, CA (US)

(73) Assignee: Veritas Technologies LLC, Mountain View, CA (US)

( * ) Notice: Subject to any disclaimer, the term of this patent is extended or adjusted under 35 U.S.C. 154(b) by 2846 days.

(21) Appl. No.: 11/477,502

(22) Filed: Jun. 29, 2006

(51) Int. Cl.
*G06F 17/30* (2006.01)

(52) U.S. Cl.
CPC .. *G06F 17/30067* (2013.01); *G06F 17/30233* (2013.01); *G06F 17/30235* (2013.01)

(58) Field of Classification Search
CPC ......... G06F 17/30067; G06F 17/30235; G06F 17/30233; G06F 3/067
USPC ........... 707/1–3, 10; 709/200, 203, 217, 218
See application file for complete search history.

(56) References Cited

U.S. PATENT DOCUMENTS

| | | | | |
|---|---|---|---|---|
| 5,363,487 | A * | 11/1994 | Willman | G06F 17/30067 707/E17.01 |
| 5,371,885 | A * | 12/1994 | Letwin | G06F 3/0608 |
| 5,497,492 | A * | 3/1996 | Zbikowski | G06F 15/177 713/2 |
| 5,708,832 | A * | 1/1998 | Inniss | G06F 17/30067 707/999.01 |
| 5,752,005 | A * | 5/1998 | Jones | G06F 3/0626 703/22 |
| 5,930,831 | A * | 7/1999 | Marsh | G06F 3/0607 711/112 |
| 6,125,403 | A * | 9/2000 | Berliner | 719/324 |
| 6,185,574 | B1* | 2/2001 | Howard | G06F 17/30126 |
| 6,356,915 | B1* | 3/2002 | Chtchetkine | G06F 17/30235 707/823 |
| 6,519,633 | B1* | 2/2003 | Kubik | G06F 9/4416 707/999.001 |
| 6,742,041 | B1* | 5/2004 | Bhagwat | H04L 47/10 709/230 |

(Continued)

OTHER PUBLICATIONS

"Storage Manager Registry Settings," Platform Builder for Microsoft Windows CE 5.0, © 2008 Microsoft Corporation, printed from web site http://msdn.microsoft.com/en-us/library/ms892393(printer).aspx on Jul. 1, 2008, 4 pages.

*Primary Examiner* — Heather Herndon
*Assistant Examiner* — Merilyn Nguyen
(74) *Attorney, Agent, or Firm* — Campbell Stephenson LLP

(57) ABSTRACT

A method, apparatus and computer-readable medium for extending the functionality of an operating system is described. The method comprises installing an installable file system as a root file system of the operating system, mounting a default file system of the operating system as a folder accessible by the installable file system and using the installable file system to process data between the operating system and the default file system. The apparatus is a system for extending the functionality of an operating system comprising a computing device comprising a processor and a memory for executing the operating system, wherein the operating system mounts an installable file system other than a default file system of the operating system as a root file system and the installable file system mounts the default file system of the operating system as a folder.

15 Claims, 3 Drawing Sheets

(56) References Cited

U.S. PATENT DOCUMENTS

| | | | | |
|---|---|---|---|---|
| 6,804,718 B1 * | 10/2004 | Pang | | G06F 9/54 |
| | | | | 709/224 |
| 7,761,706 B2 * | 7/2010 | Lambert | | G06F 21/10 |
| | | | | 713/165 |
| 2002/0083120 A1 * | 6/2002 | Soltis | | 709/200 |
| 2002/0194394 A1 * | 12/2002 | Chan | | G06F 3/0607 |
| | | | | 719/319 |
| 2006/0064688 A1 * | 3/2006 | Tseng | | 718/1 |
| 2007/0168678 A1 * | 7/2007 | Meenakshisundaram | | G06F 12/1483 |
| | | | | 713/189 |

* cited by examiner

METHOD AND APPARATUS FOR EXTENDING FUNCTIONALITY OF AN OPERATING SYSTEM

BACKGROUND OF THE INVENTION

Field of the Invention

Embodiments of the present invention generally relate to an operating system and, more particularly, a method and apparatus for extending functionality of the operating system.

Description of the Related Art

Mobile computing devices such as personal digital assistants (PDAs), tablet computers and devices that are a hybrid cellular phone and computer are becoming more prevalent in society. Manufacturers of these devices strive to provide a user the same functionality offered by a conventional desktop computer. However, due to the smaller physical size of the devices, storage and memory capacity are limited by the number of memory and storage devices that can physically fit into the device.

Mobile computing devices generally utilize a special operating system (OS) specifically designed for the mobile computing device. Such an operating system may take into account a need for the mobile computing device to conserve battery life, connect with a wireless network, operate in conjunction with a cellular telephone network, synchronize files and data with a conventional desktop computer, and the like.

The operating system is a collection of computer programs or routines which control execution of application programs and provides services such as resource allocation, scheduling, input/output control, and data management. Most operating systems store data in a hierarchical (tree) structure. For example, MICROSOFT WINDOWS stores data in a file. Each file is stored in a directory, also known as a folder. Collectively, the files, folders and method of organization form a file system.

The file system governs the organization, storage and access of data stored in the files by the operating system. The file system specifies a convention for naming files. These conventions include the maximum number of characters in a name, which characters can be used, and how long of a file name suffix can be used. The file system also includes a format for specifying a path to a file through the structure of directories. The file system specifies a minimum and maximum size, e.g., byte size, for each file. The file system controls file attributes, such as whether a file is a "read only" file or a "hidden file", i.e., a file generally not visible to a user examining the contents of a directory.

The file system and operating system work in conjunction with each other to determine the level of functionality available to the user. The default file system provided with the operating system may not offer the desired level of functionality required by the user. The functionality of the operating system may be extended by hooking (redirecting) calls to the file system. However, hooking calls to the file system often leads to instability of the operating system and the computing device. Multiple software programs may try to simultaneously hook the same call to the file system which also causes the operating system to become unstable. Therefore, operating system providers generally do not support hooking the file system.

Thus, there is a need in the art for a method and apparatus that extends the functionality of an operating system without causing instability of the operating system.

SUMMARY OF THE INVENTION

The present invention generally relates to an operating system and, more particularly, a method, apparatus and computer-readable medium for extending the functionality of the operating system. The method comprises installing an installable file system as a root file system of the operating system, mounting a default file system of the operating system as a folder accessible by the installable file system and using the installable file system to process data between the operating system and the default file system. The apparatus is a system for extending the functionality of an operating system comprising a computing device comprising a processor and a memory for executing the operating system, wherein the operating system mounts an installable file system other than a default file system of the operating system as a root file system and the installable file system mounts the default file system of the operating system as a folder. The computer-readable medium causes a processor to perform the steps embodied by the method.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

The present invention is a method and apparatus for extending the functionality of an operating system.

Figure 1:
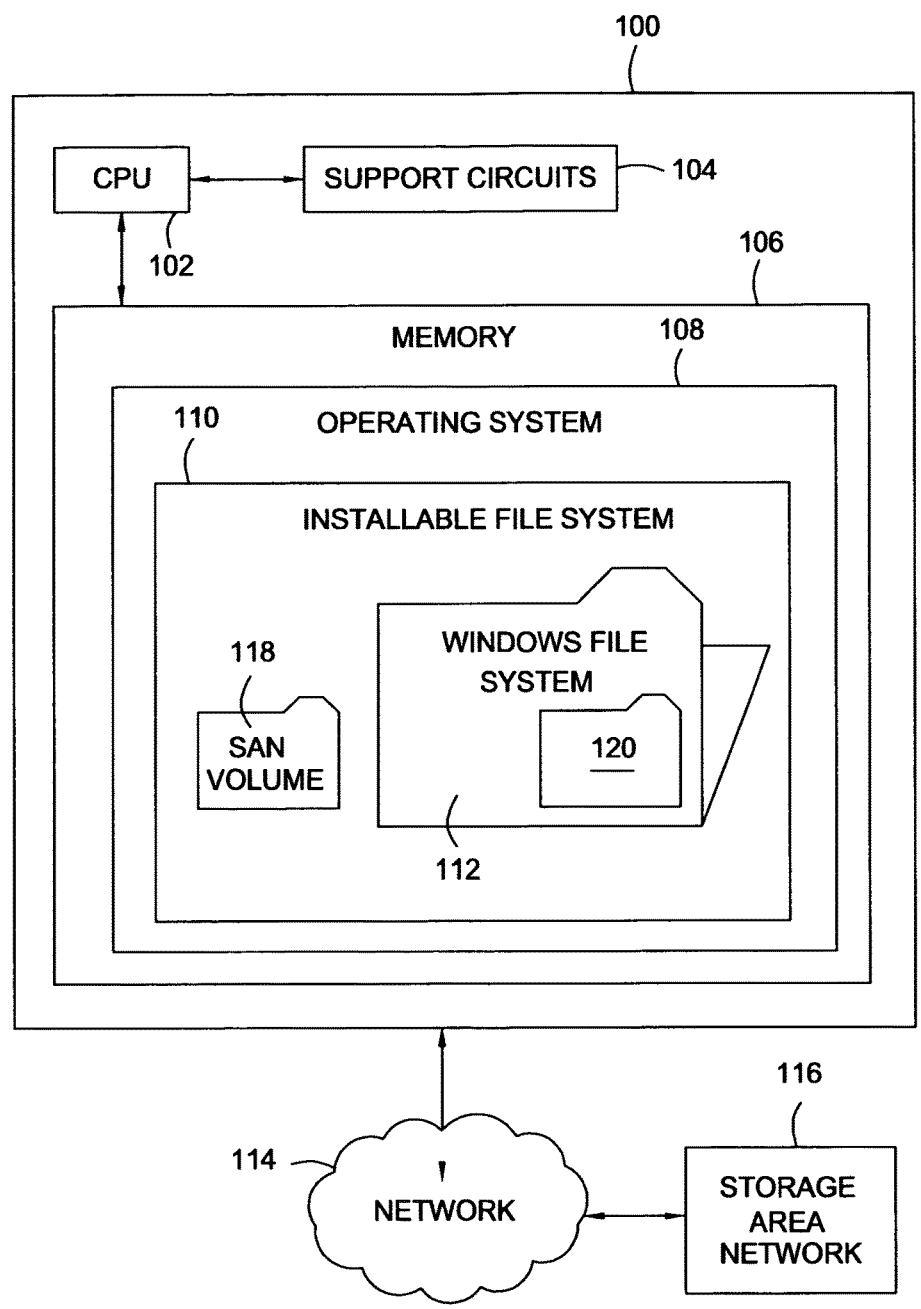
FIG. 1 is a block diagram of a computing device that can benefit from the present invention.

FIG. 1 is a block diagram of a computing environment 101 that can benefit from the present invention. The computing environment 101 comprises a computing device 100 connected to a communications network 114 connected to a network appliance, e.g., a storage area network 116. The computing device 100 is generally a mobile computing device such as a personal digital assistant (PDA), a tablet computer, a hybrid cellular phone and computer and the like. The communications network 114 may be any conventional network, such as Ethernet or fibre channel, that allows communication between the computing device 100 and the storage area network (SAN) 116. The network 114 may comprise a plurality of networks including wireless large area network (LAN), wired LAN, wide area network (WAN), Internet, and the like. The storage area network 116 comprises one or more physical storage devices such as a hard drive, digital linear tape drive, or any device commonly used for the storage of data.

The computing device 100 comprises a central processing unit (CPU) 102, support circuits 104, and a memory 106. The CPU 102 comprises one or more microprocessors or microcontrollers. The support circuits 104 operate to support the functionality of the CPU 102 and comprise such well-known circuits as input/output circuits, clock circuits, power supplies, cache, and the like. The memory 106 comprises flash memory, random access memory, read only memory, optical storage, removable storage, and combinations thereof. The memory 106 stores various software packages that are executed by the CPU 102 to enable the computing device 100 to function. These software packages include an operating system (OS) 108 and an installable file system 110. The operating system 108 is an operating system designed for a mobile computing device such as MICROSOFT WINDOWS MOBILE (WM5), PALM OS, SYMBIAN and LINUX.

The installable file system 110 offers extended functionality, such as direct encryption of a file, direct antivirus scanning of a file based on the contents of the file before the file is written, and any operation on the file level between the OS 108 and the installable file system 110. Such functionality is not available with the default file system provided by WM5.

The installable file system 110 is mounted directly by the OS 108 as the root file system. The installable file system 110 governs the organization, storage and access of data stored in the files by the operating system 108 The installable file system 110 is capable of mounting the default file system of the operating system 108 as a folder. In one embodiment of the invention, the operating system 108 is MICROSOFT WINDOWS MOBILE and the default file system is a MICROSOFT WINDOWS file system 112. Mounting the MICROSOFT WINDOWS file system 112 as a folder allows the installable file system 110 to access file information, read and write data to the MICROSOFT WINDOWS file system 112 and make the contents of the MICROSOFT WINDOWS file system 112 available to a user of the computing device 100.

In another embodiment of the invention, a storage area network (SAN) volume 118 is mounted as a folder on the installable file system 110 along side the MICROSOFT WINDOWS file system 112. The SAN volume 118 stores at least one logical address for application data that is physically stored on the storage area network 116. The SAN volume 118 folder appears as a local folder to the user of the computing device.

The installable file system 110 seamlessly integrates with the operating system 108 and the MICROSOFT WINDOWS file system 112 in such a manner that the user is unaware a different file system is being utilized by the OS 108 except for the presence of extended functionality built into the installable file system 110 as discussed above. The user would still perform most file level functions, such as opening and saving a file, in the same manner as with the MICROSOFT WINDOWS file system 112.

The installable file system 110 maps read and write requests from the OS 108 to the MICROSOFT WINDOWS file system 112. The mapping of read and write requests from the OS 108 to the MICROSOFT WINDOWS files system 112 allows the installable file system 110 to process such read and write requests at the file level. For example, the installable file system 110 is capable of scanning the contents of a file for a virus before completing a write of the file to the MICROSOFT WINDOWS file system 112. The installable file system 110 is also capable of encrypting the contents of a file before completing a write of the file to the MICROSOFT WINDOWS file system 112.

In one embodiment of the invention the MICROSOFT WINDOWS file system 112 is a mounted as a hidden folder and the contents, i.e., directories and files, of the MICROSOFT WINDOWS file system 112 are displayed as the contents of the installable file system 110. The contents of the MICROSOFT WINDOWS file system are marked with a special flag such that the installable file system 112 is capable of routing system calls from the operating system to the MICROSOFT WINDOWS file system 112.

The MICROSOFT WINDOWS file system 112 folder stores application software 120. Application software 120 may include such programs as antivirus software, email software, firewall software, word processing software, collaboration software, or any software used on the computer device 100. The application software 120 generates read/write requests that are processed by the installable file system 110 and serviced by the OS 108.

In one embodiment of the invention the installable file system 110 maps read and write requests from the application software 120 stored within the MICROSOFT WINDOWS file system 112 folder to the SAN volume 118 folder. As discussed above, application data within the SAN volume 118 folder is stored remotely on the SAN 116. By storing the application data remotely, the computing device 100 has access to a greater amount of storage space than a conventional mobile computing device.

Figure 2:
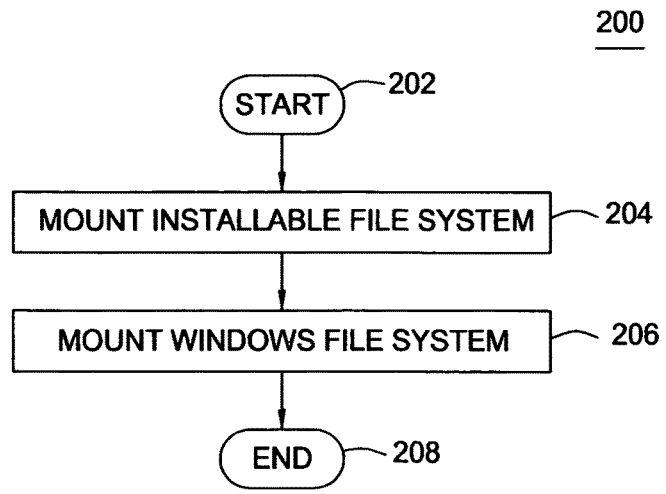
FIG. 2 is a flow diagram of a method for installing an installable file system in accordance with the present invention.

FIG. 2 is a flowchart of a method 200 of installing the installable file system in accordance with the present invention. The method 200 starts at step 202 and proceeds to step 204. At step 204, an installable file system 110 is mounted on an operating system 108 (e.g., WM5). The operating system 108 is assumed to have been installed on the device prior to instantiating the method 200. At step 206, a MICROSOFT WINDOWS file system 112 is mounted as a folder on the installable file system 112. The method 200 ends at step 208.

Figure 3:
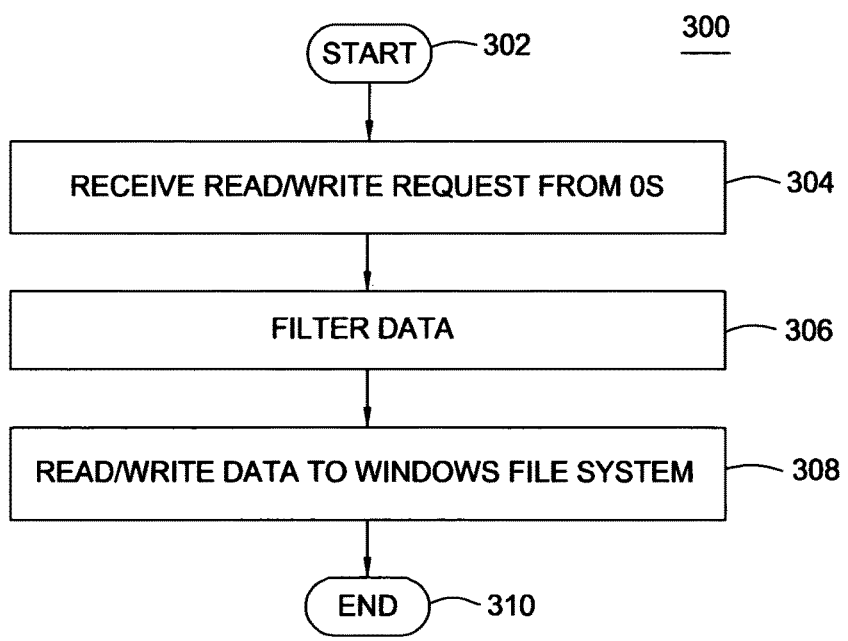
FIG. 3 is a flow diagram of a method for operating an installable file system to process read/write accesses to another file system in accordance with the present invention.

FIG. 3 is a flowchart of a method 300 of operating an installable file system 110 to process read/write accesses to the WINDOWS file system 112 in accordance with the present invention. The method 300 starts at step 302 and proceeds to step 304. At step 304, the operating system 108 provides a read/write (I/O) request to an installable file system 110. At step 306, the installable file system 110 processes data requested by the read/write request at step 304. Processing the data may include scanning the contents of the data for a virus or encrypting the data. Antivirus and encryption methods are well known by those skilled in the art and any acceptable method of antivirus or encryption may be utilized in conjunction with the present invention. At step 308, the installable file system 110 completes the read/write request by reading or writing the data to or from the MICROSOFT WINDOWS file system 112 as requested by the operating system 108. The present invention provides the benefit of extending the functionality of the operating system beyond the capabilities of the default file system, e.g., scanning for a virus before a file is written to the default file system or encrypting data before the data is written to the default file system. The method ends at step 310.

Figure 4:
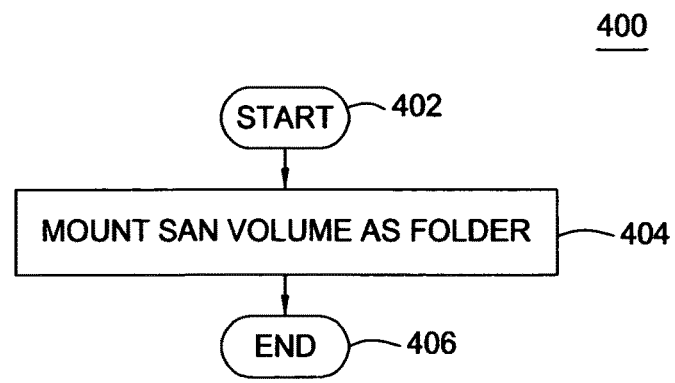
FIG. 4 is a method of mounting a storage area network (SAN) volume 118 as a folder.

FIG. 4 is a method 400 of mounting a storage area network (SAN) volume 118 as a folder. The method 400 assumes an installable file system 110 has been mounted as the root file system by the operating system 108 and that a MICROSOFT WINDOWS file system 112 has been mounted as a folder on the installable file system 110.

The method 400 starts at step 402 and proceeds to step 404. At step 404, the SAN volume 118 is mounted as a folder on the installable file system 110 along side the MICROSOFT WINDOWS file system 112. By mounting the SAN volume 118 as a folder, the computing device 100 can store application software within the MICROSOFT WINDOWS file system 112 and application data and larger files that exceed the physical storage capacity of the computing device 100 can be stored to the SAN volume 118. The SAN volume 118 maps the application data to a storage area network 116. Thus, the present invention provides the benefit of allowing a user store data beyond the normal capacity of the computing device 100 without any physical modification to the computing device 100. The method 400 ends at step 406.

Figure 5:
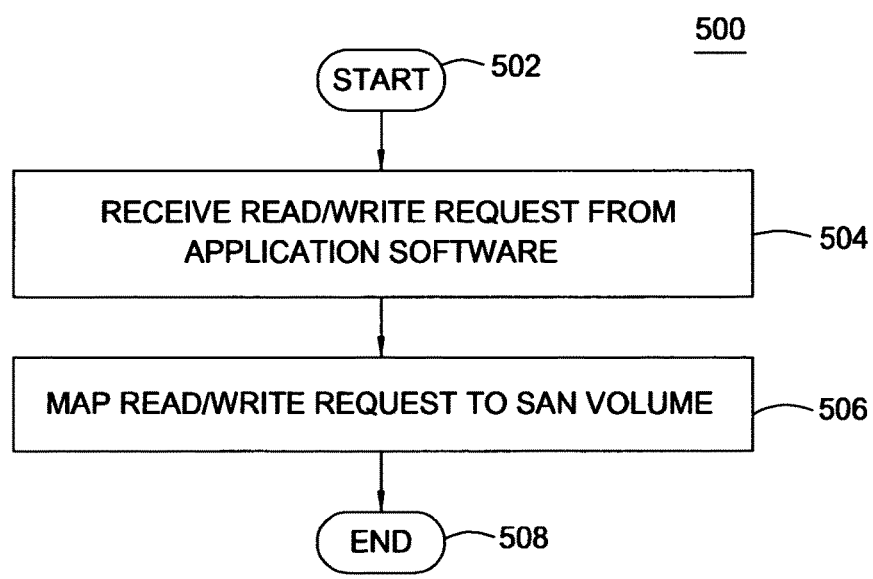
FIG. 5 is a flow diagram of a method for mapping read/write requests to a storage area network (SAN) in accordance with the present invention.

FIG. 5 is a flow diagram of a method 500 of mapping a read/write request for data from application software 120 to a storage area network 116 in accordance with the invention. The method 500 starts at step 502 and proceeds to step 504. At step 504, an installable file system 110 receives a read/write (I/O) request for application data from application software 120. At step 506, the installable file system maps the read/write request to a SAN volume 118. The SAN volume 118 is mounted as a folder on the installable file system 110 and coexists along side the MICROSOFT WINDOWS file system 112. The SAN volume 118 stores the application data at a logical address within the SAN volume 118 and at a physical address within the SAN 116. The SAN volume 118 appears to a user as a locally available folder even though the application data is stored remotely on the SAN 116. The installable file system 110 retrieves the application data requested by the application software 120 from the SAN volume 118. Because the application software 120 is stored locally within the computing device 100 and the application data is stored remotely on the SAN 116, the present invention increases the amount of application software 120 that can be stored on the computing device 100. The method 500 ends at step 508.

The present invention is an installable file system that provides the benefit of extending the functionality of an operating system. By mounting the installable file system as the operating system's root file system and then mounting the operating system's default file system as a folder, the installable file system is capable of processing data between the operating system and the default file system. Further, the installable file system also allows a computing device to map read and write requests from the operating system to a storage area network. By mapping the read and write requests to the storage area network, the computing device is able to store and access a greater amount of data than can be physically stored within the confines of the computing device itself. Thus, the present invention provides the additional benefit of increasing the storage capacity of the computing device beyond that generally available to a conventional computing device.

While the foregoing is directed to embodiments of the present invention, other and further embodiments of the invention may be devised without departing from the basic scope thereof, and the scope thereof is determined by the claims that follow.

The invention claimed is:

1. A method comprising:
installing an installable file system as a root file system of an operating system;
mounting a default file system of the operating system on the installable file system, wherein
the default file system is mounted as a first folder accessible by the installable file system, and
the mounting the default file system is performed by the installable file system, wherein
the installable file system provides functionality that is not available in the default file system; and
using the installable file system to process data between the operating system and the default file system.

2. The method of claim 1 wherein using the installable file system to process data further comprises scanning the data for a virus.

3. The method of claim 1 wherein using the installable file system to process data further comprises encrypting the data.

4. The method of claim 1 further comprising mounting a storage area network volume as a second folder accessible by the installable file system.

5. The method of claim 4 further comprising mapping a read/write request for an amount of application data from an application stored within the default file system to the second folder.

6. The method of claim 1, wherein
the installable file system is configured to map read and write requests from the operating system to the installable file system.

7. The method of claim 1, wherein
the first folder stores at least one software application.

8. A system comprising:
a computing device comprising a processor and a memory for executing an operating system, wherein the operating system
installs an installable file system other than a default file system of the operating system as a root file system of the operating system,
mounts the default file system of the operating system on the installable file system, wherein
the default file system of the operating system is mounted as a folder accessible by the installable file system,
the default file system is mounted by the installable file system, wherein
the installable file system provides functionality that is not available in the default file system, and
uses the installable file system to process data between the operating system and the default file system.

9. The system of claim 8 wherein the installable file system processes data between the operating system and the default file system of the operating system.

10. The system of claim 8 wherein the installable file system maps data between the operating system and a storage area network.

11. The system of claim 8 wherein the operating system is at least one of MICROSOFT WINDOWS MOBILE operating system, PALM OS, SYMBIAN and LINUX.

12. A non-transitory computer-readable storage medium having stored thereon a plurality of instructions, the plurality of instructions including instructions which, when executed by a processor, cause the processor to perform the steps of:
   installing an installable file system as a root file system of an operating system;
   mounting a default file system of the operating system on the installable file system, wherein
      the default file system is mounted as a first folder accessible by the installable file system, and
      the mounting of the default file system is performed by the installable file system, wherein
         the installable file system provides functionality that is not available in the default file system; and
   using the installable file system to process data between the operating system and the default file system.

13. The non-transitory computer-readable storage medium of claim 12, wherein the plurality of instructions further comprise additional instructions configured to cause the processor to scan the data for a virus.

14. The non-transitory computer-readable storage medium of claim 12, wherein the plurality of instructions further comprise additional instructions configured to cause the processor to encrypt the data.

15. The non-transitory computer-readable storage medium of claim 12, wherein the plurality of instructions further comprise additional instructions configured to cause the processor to map a read/write request from the operating system to a storage area network.

\* \* \* \* \*